Sept. 29, 1925.
M. P. BROWN
BEARING DEVICE
Filed April 4, 1924
1,555,632
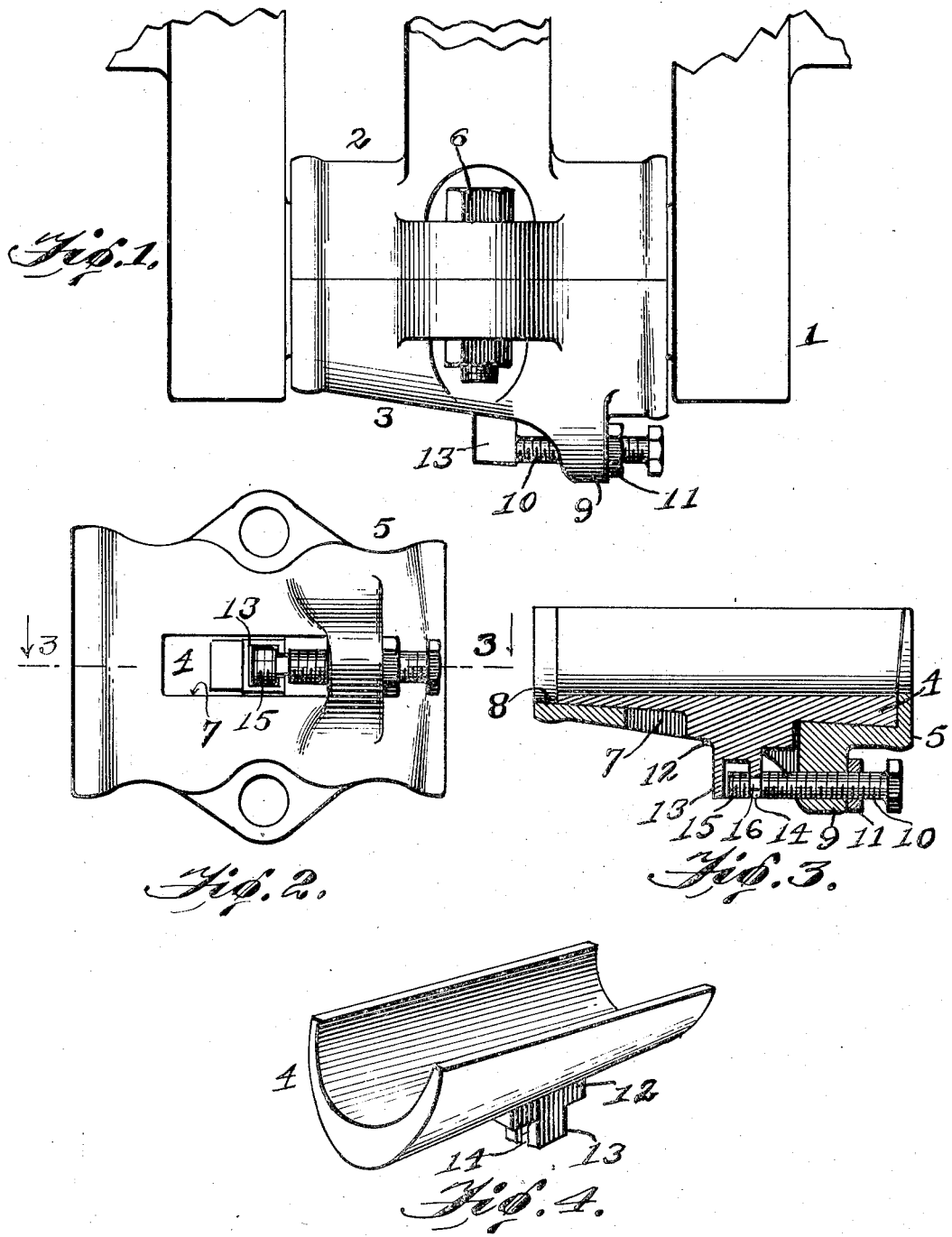

Patented Sept. 29, 1925.

1,555,632

UNITED STATES PATENT OFFICE.

MANUEL P. BROWN, OF FAIRMOUNT, ILLINOIS, ASSIGNOR TO BROWN ADJUSTABLE BEARING CO., OF FAIRMOUNT, ILLINOIS, A CORPORATION.

BEARING DEVICE.

Application filed April 4, 1924. Serial No. 704,250.

*To all whom it may concern:*

Be it known that I, MANUEL P. BROWN, a citizen of the United States, residing at Fairmount, in the county of Vermilion and State of Illinois, have invented certain new and useful Improvements in a Bearing Device, of which the following is a specification, reference being had therein to the accompanying drawings.

This invention relates to a bearing device for taking up the wear on a shaft, and particularly a crank shaft of a motor, and the object of the invention is the construction of a simple and efficient bearing device which comprises a minimum number of parts, and which is positive and efficient in operation.

With this and other objects in view, my invention comprises certain novel combinations, constructions and arrangements of parts as will be hereinafter described, illustrated in the accompanying drawings and more particularly pointed out in the appended claim.

In the drawings:

Figure 1 is a view, in side elevation, of a bearing device constructed in accordance with the present invention.

Figure 2 is a bottom plan view of the outer member of a bearing device.

Figure 3 is a sectional view, taken on line 3—3 Fig. 2, and looking in the direction of the arrows.

Figure 4 is a perspective view of the inner section of the device.

Referring to the drawings by numerals, 1 designates the crank of a motor and 2 is the inner member of a bearing, while 3 is the outer member thereof.

My invention particularly relates to the novel construction of the outer member 3 which outer member comprises the inner slidable section 4 and the outer fixed section 5.

The outer section 5 is fastened, by bolts 6, to the inner member 2 (Fig. 1), and this section is provided with an elongated aperture 7, and with an inclined, inner face 8 upon which is slidably mounted the tapering, inner section 4 (Fig. 3). A depending lug or shoulder 9 is formed integrally on the outer face of the outer section 5, and through this shoulder 9 is threaded a bolt 10. A lock nut 11 is mounted on the bolt and is adapted to be screwed against the shoulder 9 for holding the bolt in a locked position.

The inner section 4 is provided with an outwardly extending or depending rib 12, and integral with this rib 12 is a housing 13, which housing 13 is provided at one end with slot 14. The head 15, at the inner end of bolt 10, is seated in the housing 13, with a neck 16 resting in the slot 14.

Upon loosening lock nut 11, on bolt 10, the bolt can be rotated for moving the inner section 4 longitudinally of the outer section 5 to take up, or eliminate the wear on the bearing and thus keep the crank (or any other shaft) that is seated in the bearing from having a loose movement or rattling. After the desired adjustment of the inner section has been obtained, the head 15, seated in the housing 13, will hold the inner section in its adjusted position until the operator tightens lock nut 11 against shoulder 9, whereupon the inner section 4 will be securely held against movement as well as in the desired adjusted position.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

A bearing section comprising a body portion having its inner surface sloping upwardly towards one end, said body being provided with a longitudinally extending aperture and with a shoulder at one end of said aperture having a threaded opening formed therein, a tapering inner section fitting in said body and resting upon the sloping surface thereof and permitted sliding movement longitudinally of the body, said inner section provided with a rib extending through the elongated aperture of the body and having its free end portion provided with a recess forming an open ended housing, one wall of the housing being provided with a slot opening through its lower end, and a threaded bolt passing through the threaded opening of said shoulder and provided with a neck fitting into the slot formed in the wall of said housing and with a head at its inner end loosely fitting within the housing, said bolt when rotated serving to impart longitudinal sliding movement to the inner section to adjust the position of the inner section with respect to the body to take up lateral thrust and radial wear.

In testimony whereof I hereunto affix my signature.

MANUEL P. BROWN.